3,185,675
PEPTIDE

Henry Schmitz, Syracuse, and Robert L. De Vault, North Syracuse, N.Y., assignors to Bristol-Myers Company, New York, N.Y., a corporation of Delaware
No Drawing. Filed Mar. 28, 1963, Ser. No. 268,552
1 Claim. (Cl. 260—112)

This invention relates to a new and useful polypeptide and to its production. More particularly it relates to processes for its production from the complex polysaccharide actinogen by treatment with trichloroacetic acid and to methods for its recovery and purification. The invention embraces this polypeptide in dilute solutions, as crude concentrates and as purified solids. The polypeptide of the present invention is useful in the medical sciences in therapy, e.g. to increase the resistance of the host to infection, in animal experimentation and as a tool for the study of certain phenomena such as the defense mechanism of the host and antibody formation.

The starting material for the preparation of the polypeptide of the present invention is the complex polysaccharide actinogen. The preparation and properties of actinogen have been described in U.S. Patent 3,060,099 and by Schmitz et al. in Cancer Research, 22 (2), 163–166, February 1962, and by Bradner et al., Cancer Research 22 (2), 167–173, February 1962.

There is now provided, according to the present invention a polypeptide free of carbohydrates and lipids which is soluble in water to the extent of 35 mgm./ml. and is insoluble in glacial acetic acid, dimethylformamide and dioxane, is reprecipitated from aqueous solution by 60% ethanol and by 0.3 molar ammonium sulfate, exhibits in water an ultraviolet spectrum showing one peak at 270 m$\mu$ with an absorptivity of 1.68, exhibits when pelleted in potassium bromide infrared absorption maxima at 2.8, 3.2 3.4, 5.9, 6.2, 6.3 and 6.7 microns, has as its specific rotation $[\alpha]_D^{25°}$ —53.7° (c.=1, water), decomposes without melting on heating at 240° C., has a molecular weight of 15,000±20% as determined from ultracentrifuge data, is found by analysis to contain about 50.0% carbon, 6.82% hydrogen and 15.0% nitrogen and yields on hydrolysis the following seventeen amino acids in the proportions indicated in parentheses in terms of grams per 100 g. polypeptide:

Aspartic acid _____ (11.38)
Threonine _____ (8.12)
Serine _____ (5.01)
Glutamic acid _____ (10.17)
Proline _____ (6.50)
Glycine _____ (7.12)
Alanine _____ (7.85)
½-cystine _____ (1.74)
Valine _____ (8.03)
Methionine _____ (1.29)
Iso-leucine _____ (5.66)
Leucine _____ (7.89)
Tyrosine _____ (3.32)
Phenylalanine _____ (3.04)
Lysine _____ (13.23)
Histidine _____ (0.64)
and
Arginine _____ (6.53)

There is further provided by the process of the present invention the method for producing said polypeptide which comprises hydrolitically cleaving actinogen in the presence of a strongly acid catalyst and then separating and recovering the polypeptide so-produced.

The acid catalyst used to cleave actinogen may be a strong acid such as hydrochloric acid or an acidic ion exchange resin but the use of trichloroacetic acid is preferred as it also simultaneously precipitates the polypeptide of the present invention. The polypeptide is recovered by lyophilization or, if precipitated, is collected, as by filtration. Purification is accomplished readily by dialysis and, if desired, by chromatography as on sulfoethyl cellulose or by continuous electrophoresis.

The carbohydrate components thus removed from actinogen were recovered and found to be inactive against Sarcoma 180 and against staphylococcal infections in mice.

The antitumor activity of the polypeptide of the present invention was demonstrated by an in vivo assay using Sarcoma 180 (S–180) in mice. The method follows closely those described by D. A. Clarke ("Mouse Sarcoma 180," Cancer Research, Suppl. No. 3, pp. 14–17, 1955). The in vivo S–180 tests are performed using a basic experimental group of 50 mice implanted with fragments of uniform size (ca. 2 mm.³) from a single donor tumor. These 50 mice are always of the same strain (Swiss-Webster), sex, farm source and weight (20±2 g.). They are assorted among eight therapy sets of five animals each and one control set of ten animals. The therapy mice are injected intraperitoneally with candidate anti-tumor agents starting 24 hours after tumor implantation and continuing twice daily for a total of 13 injections. Solutions of solids are admininstered in a uniform volume of 0.5 ml. Locke-Ringer saline. The ten control mice receive 13 injections of Locke-Ringer saline only. On the eighth day after implantation, the tumor sizes are evaluated by measuring the mass through the skin of the animal in its longest dimension and the perpendicular to it with vernier calipers. The average diameter (A.D.) of the tumors of the treated animals is determined and compared to that of controls. The treated/control ratio ($T/C$) of these average diameters is calculated so that significance of inhibition by therapy can be ascertained. A thorough statistical study has suggested $T/C=0.75$ as a useful maximum cut-off point for activity. In order to observe any possible delayed effects the animals are in some cases retained for several weeks after cessation of therapy to determine the fate of the tumor. In nearly all instances tumors inhibited due to therapy resume growth and rapidly catch up to the controls in size. On rare occasions regression of tumors with complete cure of the animal occurs as a result of therapy. The spontaneous regression rate is 5–10% for S–180; the remaining tumors grow rapidly and kill the host animal in about three weeks' time. The best available anti-tumor agents can cause better than 50% complete regressions among treated mice with this tumor.

The results were as follows:

ASSAY VS. S–180

| Test No. | Dosage, mg./kg./day | Response-Treated/Control | | | Survivors |
|---|---|---|---|---|---|
| | | Weight Change (g.) | Tumor Size (cm.) | Effect [1] | |
| 1 | .20 | −2.7/+1.0 | 0.35/0.97 | 0.36 | 5/5 |
|   | .10 | −0.7/+1.0 | 0.58/0.97 | 0.59 | 5/5 |
|   | .05 | −0.5/+1.0 | 0.58/0.97 | 0.59 | 5/5 |
| 2 | .02 | −0.3/−0.8 | 1.01/1.33 | 0.75 | 5/5 |
|   | .01 | −1.2/−0.8 | 1.16/1.33 | 0.87 | 5/5 |
|   | .005 | −1.1/−0.8 | 1.09/1.33 | 0.81 | 5/5 |
| 3 | .05 | −6.8/−0.6 | 0.40/0.82 | 0.48 | 5/5 |
|   | .03 | −4.8/−0.6 | 0.41/0.82 | 0.50 | 5/5 |
|   | .02 | −2.8/−0.6 | 0.48/0.82 | 0.58 | 5/5 |
|   | .01 | −1.4/−0.6 | 0.50/0.82 | 0.60 | 5/5 |
|   | .10 | −4.8/−0.4 | 0.44/0.82 | 0.53 | 5/5 |
|   | .07 | −2.9/−0.4 | 0.50/0.82 | 0.60 | 5/5 |
|   | .05 | −3.3/−0.4 | 0.49/0.82 | 0.59 | 5/5 |
| 4 | .02 | −1.4/−0.4 | 0.65/0.82 | 0.79 | 5/5 |
|   | .015 | 0.0/−0.4 | 0.62/0.82 | 0.75 | 5/5 |
|   | .010 | −0.1/−0.4 | 0.88/0.82 | 1.07 | 5/5 |
|   | .007 | +0.4/−0.4 | 0.62/0.82 | 0.75 | 5/5 |
|   | .005 | +0.4/−0.4 | 0.98/0.82 | 1.19 | 5/5 |

[1] Value of 0.75 or less considered significant inhibition of S–180.

Thus the polypeptide of the present invention caused inhibition in the dosage range 0.01–0.02 to 0.1–0.2 and was thus active at approximately one-tenth the dosage of actinogen.

The polypeptide of the present invention had a HeLa cell culture $ID_{50}$ of 0.13–0.18 mcg./ml. which is about one-tenth that of actinogen.

The polypeptide of the present invention at concentrations of 200 mcg./ml. failed to inhibit a wide spectrum of microorganisms (including anaerobic, aerobic and facultative Gram-positive and Gram-negative bacteria, yeasts and protozoa) except for inhibition at 100 mcg./ml. of the yeast *Kloeckera brevis* and at 50 mcg./ml. the protozoa, *Ochromonas malhamensis*.

Given to Swiss mice by the intraperitoneal route, the polypeptide showed an acute $LD_{50}$ of 1.7 mgm./kg.

The polypeptide of the present invention stimulates the host defense mechanism and stimulates antibody production. Thus when a "weak" antigen is given to produce antibodies, the administration of the polypeptide leads to the production of more antibodies. This is of value in assisting a search for a weak but nontoxic antibiotic. The polypeptide of the present invention is a useful tool for the study of factors involved in host resistance, antibody formation, the removal of particles from the blood stream by the reticuloendothelial system and the relation of the reticuloendothelial system to overcoming infections. The polypeptide of the present invention is thus used in elucidating body mechanisms in a manner similar to the use of bacterial endotoxins. The polypeptide of the present invention is also useful to potentiate relatively ineffective antibacterial agents, and especially antibiotics, in order to provide greater activity or to enable the use of lower doses.

The polypeptide of the present invention is a useful agent to cause the regression of certain tumors. When such regression has occurred in animals, the same strain of tumor can no longer be implanted. There is thus obtained for study in a practical, simple manner, a unique laboratory tested animal, i.e. one which is "resistant" to this particular tumor. There is thus provided for scientific study of detailed biochemical and physiological mechanisms a pair of otherwise apparently identical animals, one of which is resistant to the tumor and one of which (the untreated control) is not so resistant.

The polypeptide of the present invention is useful in animals to cause a partial or complete regression of certain tumors.

The polypeptide of the present invention is useful in animals by concomitant administration with autologous tumor vaccines.

The following example will serve to illustrate the present invention without limiting it thereto.

*Example*

A two percent aqueous solution of actinogen was mixed at room temperature with an equal volume of 50% trichloroacetic acid. The precipitate which formed rapidly was suspended in water and dialyzed. The non-dialyzable suspension was then centrifuged and the supernatant containing the polypeptide was freeze-dried. The yield was about 10% based on the weight of actinogen; the product did not give a Molisch test and, on acid hydrolysis and chromatography of the hydrolyzate on thin-layer plates, it appeared to contain 17 amino acids. The supernatant from the trichloroacetic acid treatment, on dilution with an equal volume of ethanol, yielded a nitrogen-free carbohydrate, 57% of the weight of actinogen.

The polypeptide was further purified by chromatography no sulfoethyl cellulose (Cellex SE, a product of Bio-Rad Laboratories, Richmond, California), in the hydrogen form. 400 mgs. of the polypeptide in 100 ml. of water was placed on a column of 8 g. of the exchanger; after washing with water the active material was eluted with increasing concentrations of a pH 8 buffer solution which was 0.1 M with respect to sodium chloride and .05 M with respect to sodium phosphate. Dialysis and freeze-drying afforded 150 mg. of the polypeptide which inhibited S–180 in mice at 2 mcg. per mouse per day.

This material was subjected to continuous electrophoresis, employing 600 volts in a Beckmann C.P. apparatus and a pH 6.5 buffer consisting of 5% pyridine and 0.2% acetic acid. The peptide under these conditions behaved as a cation. The most active material gave a positive response against S–180 and against Carcinoma 755 in mice at 0.2 mcg./day/animal.

The polypeptide had a molecular weight of 15,000 ±20%, as determined from ultracentrifuge data. It was excluded on Sephadex G75 (product of the Pharmacia Corp., Upsala, Sweden), and retarded on Sephadex G100. These are commercially available cross-linked dextran polymers which form gels with water and act as molecular sieves, said to absorb molecules below 3000, 7000 and 10,000 molecular weight, respectively. Anal.: C, 50.0; H, 6.82; N, 14.8, 15.1. It decomposed at about 240° C. without melting. It was soluble in water to the extent of 35 mg./ml. and insoluble in common organic solvents including glacial acetic acid, dimethylformamide, and dioxane. It was reprecipitated from aqueous solution with 60% ethanol or 0.3 M ammonium sulfate.

On electrophoresis in phosphate buffer up to pH 8.2 and in borax sodium hydroxide buffer from pH 8.4 to 9.0 the polypeptide behaved as a cation. At higher pH values it moved by endosmosis in the same position as neutral yellow (Apolon, obtained from Microchemical Specialties Co., Berkeley, California). The polypeptide was detected by spraying with hypochlorite and starch-iodide by the method of R. H. Mazur, B. W. Ellis and P. S. Cammarata, J. Biol. Chem., 237, 619 (1961).

The ultraviolet spectrum in water showed one peak at 270 mµ with an absorptivity of 1.68. The infrared spectrum in a KBr pellet had maxima at 2.8, 3.2, 3.4, 5.9, 6.2, 6.3 and 6.7 microns. The specific rotation was −53.7° (c.=1, water).

The polypeptide when purified contained no Molisch-positive material or lipids. The Pauly, Sakaguchi and Diacetyl tests were positive. It was resistant to trypsin and peptidase but could be made reactive by hydrogen-bond breaking agents.

The following percentages of amino acids were found:

| | gm./100 gm. |
|---|---|
| Aspartic | 11.38 |
| Threonine | 8.12 |
| Serine | 5.01 |
| Glutamic | 10.17 |
| Proline | 6.50 |
| Glycine | 7.12 |
| Alanine | 7.85 |
| ½-cystine | 1.74 |
| Valine | 8.03 |
| Methionine | 1.29 |
| Iso-leucine | 5.66 |
| Leucine | 7.89 |
| Tyrosine | 3.32 |
| Phenylalanine | 3.04 |
| Lysine | 13.23 |
| Histidine | 0.64 |
| Arginine | 6.53 |

We claim:

A polypeptide free of carbohydrates and lipids which is soluble in water to the extent of 35 mgm./ml. and is insoluble in glacial acetic acid, dimethylformamide and dioxane, is reprecipitated from aqueous solution by 60% ethanol and by 0.3 molar ammonium sulfate, exhibits in water an ultraviolet spectrum showing one peak at 270 mµ with an absorptivity of 1.68, exhibits when pelleted in potassium bromide infrared absorption maxima at 2.8, 3.2, 3.4, 5.9, 6.2, 6.3 and 6.7 microns, has as its specific rotation $[\alpha]_D^{25°}$ —53.7° (c.=1, $H_2O$), decomposes on heating at 240° C., has a molecular weight of 15,000 ±20% as determined from ultracentrifuge data, is found by analysis to contain about 50.0% carbon, 6.82% hydrogen and 15.0% nitrogen and yields on hydrolysis the following seventeen amino acids in the proportions indicated in parentheses in terms of grams per 100 g. polypeptide:

| | |
|---|---|
| aspartic acid | (11.38) |
| threonine | ( 8.12) |
| serine | ( 5.01) |
| glutamic acid | (10.17) |
| proline | ( 6.50) |
| glycine | ( 7.12) |
| alanine | ( 7.85) |
| ½-cystine | ( 1.74) |
| valine | ( 8.03) |
| methionine | ( 1.29) |
| iso-leucine | ( 5.66) |
| leucine | ( 7.89) |
| tyrosine | ( 3.32) |
| phenylalanine | ( 3.04) |
| lysine | (13.23) |
| histidine | ( 0.64) |
| and arginine | ( 6.53) |

References Cited by the Examiner

UNITED STATES PATENTS 3,060,099   10/62   Schmitz _____ 195—11

OTHER REFERENCES

Brockmann: Annals of New York Acad. of Science, vol. 80, October 1960, RC–271–C4N4, pp. 323–335.

Ikawa: J. Nat. Cancer Inst. 13, 157–166, 1952.

Inouye: J. Agric. and Biol. Chem., Japan, 26 (9), 563–571, 1962.

Merck: Merck, 7th ed., 1960, p. 1058.

Johnson: Annals of New York Acad. of Science, vol. 80, Art 2, October 1960, RC–271–C4N4, pp. 336–341.

Schmitz et al.: J. Med. Chem., 6, 613, 1963, 167–65AB–03.

Sohler: J. of Bacteriology, vol. 75, January-June 1958, QR–1–J8, pp. 283–290.

References Cited by the Applicant

Bradner et al.: Cancer Research, 22 (2), 167–173, February 1962.

D. A. Clarke: Cancer Research, Suppl. No. 3, 14–17 (1955).

Schmitz et al.: Cancer Research, 22 (2), 163–166, February 1962.

JULIAN S. LEVITT, *Primary Examiner.*

FRANK CACCIAPAGLIA, JR., *Examiner.*